(12) United States Patent
Rhee et al.

(10) Patent No.: US 11,813,924 B2
(45) Date of Patent: Nov. 14, 2023

(54) WATER-COOLING TYPE CONDENSER

(71) Applicant: Hanon Systems, Daejeon (KR)

(72) Inventors: Sangyong Rhee, Daejeon (KR); Seung Su Baek, Daejeon (KR); Sang Ok Lee, Daejeon (KR); Han Gil Youn, Daejeon (KR); Hyun Hee Jung, Daejeon (KR); Hyunkeun Shin, Daejeon (KR)

(73) Assignee: Hanon Systems, Daejeon (KR)

( * ) Notice: Subject to any disclaimer, the term of this patent is extended or adjusted under 35 U.S.C. 154(b) by 355 days.

(21) Appl. No.: 17/258,085

(22) PCT Filed: Jul. 22, 2019

(86) PCT No.: PCT/KR2019/009043
§ 371 (c)(1),
(2) Date: Jan. 5, 2021

(87) PCT Pub. No.: WO2020/022726
PCT Pub. Date: Jan. 30, 2020

(65) Prior Publication Data
US 2021/0283992 A1    Sep. 16, 2021

(30) Foreign Application Priority Data

Jul. 24, 2018 (KR) .................. 10-2018-0085907
Jul. 24, 2018 (KR) .................. 10-2018-0085947

(51) Int. Cl.
*B60H 1/32* (2006.01)
*B60H 1/00* (2006.01)
(Continued)

(52) U.S. Cl.
CPC ....... *B60H 1/3227* (2013.01); *B60H 1/00571* (2013.01); *B60H 1/32281* (2019.05);
(Continued)

(58) Field of Classification Search
CPC . B60H 1/3227; B60H 1/00571; F28F 9/0075; F28F 9/0246; F28F 9/26; F28F 2275/04
See application file for complete search history.

(56) References Cited

U.S. PATENT DOCUMENTS 7,469,554 B2 * 12/2008 Martins .................. F28D 9/005
62/506
7,621,150 B2 * 11/2009 Kadle ..................... F25B 40/00
165/175

(Continued)

FOREIGN PATENT DOCUMENTS

JP      2008-267752 A    11/2008
KR   10-2012-0061534 A    6/2012
(Continued)

*Primary Examiner* — Tho V Duong
*Assistant Examiner* — Raheena R Malik
(74) *Attorney, Agent, or Firm* — Norton Rose Fulbright US LLP; James R. Crawford

(57) ABSTRACT

The present invention relates to a water-cooling type condenser, and more specifically, to a water-cooling type condenser including a fixing plate for fixing a gas and liquid separator, wherein the fixing plate is formed to enable a refrigerant and cooling water to flow by means of coupling between first and second plate portions, and is integrally formed, by brazing, with remaining components (a plate, a first inlet pipe, a first outlet pipe, a second inlet pipe, and a second outlet pipe), so as to enhance assemblability and durability and enable size reduction.

22 Claims, 19 Drawing Sheets

(51) Int. Cl.
*F28F 9/007* (2006.01)
*F28F 9/02* (2006.01)
*F28F 9/26* (2006.01)

(52) U.S. Cl.
CPC .......... *F28F 9/0075* (2013.01); *F28F 9/0246* (2013.01); *F28F 9/26* (2013.01); *F28F 2275/04* (2013.01)

(56) References Cited

U.S. PATENT DOCUMENTS

| | | | | |
|---|---|---|---|---|
| 7,859,845 | B2* | 12/2010 | Ullman | F28F 3/083 165/80.4 |
| 8,122,736 | B2* | 2/2012 | Martins | F28D 9/005 62/507 |
| 9,109,840 | B2* | 8/2015 | Kadle | B60H 1/00899 |
| 9,618,280 | B2* | 4/2017 | Magnier-Cathenod | F28D 9/005 |
| 9,810,182 | B2* | 11/2017 | Amaral | F02M 31/102 |
| 9,897,389 | B2* | 2/2018 | Denoual | F28D 9/0056 |
| 10,066,878 | B2* | 9/2018 | Huang | F25B 40/00 |
| 10,151,541 | B2* | 12/2018 | Kim | F25B 40/00 |
| 10,260,817 | B2* | 4/2019 | Fetzer | F28F 3/08 |
| 10,352,598 | B2* | 7/2019 | Szostek | F25B 40/02 |
| 10,408,543 | B2* | 9/2019 | Barfknecht | F28D 9/0093 |
| 10,449,832 | B2* | 10/2019 | Lee | F28F 3/086 |
| 10,473,209 | B2* | 11/2019 | Zou | F16H 57/0413 |
| 10,935,288 | B2* | 3/2021 | Rhee | F25B 40/02 |
| 2004/0112579 | A1* | 6/2004 | Strahle | F28F 9/028 165/166 |
| 2006/0053833 | A1* | 3/2006 | Martins | F25B 39/04 62/507 |
| 2012/0234523 | A1* | 9/2012 | Jouanny | F28F 9/0246 165/166 |
| 2017/0038151 | A1* | 2/2017 | Noda | F28F 9/0251 |
| 2017/0122669 | A1* | 5/2017 | Takahashi | F28D 9/0093 |
| 2017/0131044 | A1* | 5/2017 | Martins | F28F 9/0229 |
| 2019/0063800 | A1* | 2/2019 | Rhee | F25B 39/04 |
| 2021/0283992 | A1* | 9/2021 | Rhee | F28F 9/0075 |

FOREIGN PATENT DOCUMENTS

| | | |
|---|---|---|
| KR | 10-2012-0096604 A | 8/2012 |
| KR | 20130043906 A | 5/2013 |
| KR | 10-2016-0103507 A | 9/2016 |
| KR | 10-2017-0079223 A | 7/2017 |
| WO | 2010060657 A1 | 6/2010 |
| WO | 2010108907 A1 | 9/2010 |

* cited by examiner (a)          (b)

(a)　　　　　　　　　(b)

WATER-COOLING TYPE CONDENSER

CROSS REFERENCE TO RELATED APPLICATIONS

This application is a national phase under 35 U.S.C. § 371 of International Application No. PCT/KR2019/009043 filed Jul. 22, 2019, which claims the benefit of priority from Korean Patent Application Nos. 10-2018-0085907 filed Jul. 24, 2018 and 10-2018-0085947 filed Jul. 24, 2018. The entire contents of these applications are incorporated herein by reference in their entirety.

TECHNICAL FIELD

The present invention relates to a water-cooling type condenser, and more specifically, to a water-cooling type condenser comprising a fixing plate for fixing a gas and liquid separator, wherein the fixing plate is formed to enable a refrigerant and cooling water to flow by means of coupling between first and second plate portions, and is integrally formed, by brazing, with remaining components (a plate, a first inlet pipe, a first outlet pipe, a second inlet pipe, and a second outlet pipe), so as to enhance assemblability and durability and enable size reduction.

BACKGROUND ART

In a refrigeration cycle of a general vehicle air conditioner, a heat exchange medium in the liquid state absorbs the amount of heat as much as heat of vaporization in the surroundings and an actual cooling action occurs by a vaporized evaporator. A heat exchange medium in the gas state flowing from the evaporator to a compressor is compressed at high temperature and high pressure in the compressor, heat of liquefaction is released to the surroundings while the heat exchange medium in the compressed gas state passes through a condenser and is liquefied, the liquefied heat exchange medium passes through an expansion valve again, becomes a low-temperature and low-pressure compressed vapor state, and then flows back into the evaporator and vaporized to form a cycle.

The condenser is a heat exchange medium into which a refrigerant in the gas state of high temperature and high pressure flows, heat of liquefaction is released through heat exchange, condensed in the liquid state, and then discharged, and cools the refrigerant, and may be formed as an air-cooling type using air or a water-cooling type using liquid.

The air-cooling type condenser is configured to exchange heat with air flowing into through an opening in the front of the vehicle, and is fixed to the front side of the vehicle where a bumper beam is formed for smooth heat exchange with air.

However, since the air-cooling type condenser is formed at the rear end of the bumper beam, in the event of a vehicle accident, the impact force applied to pedestrians may increase, and the heat exchanger configuration also has a high risk of being damaged by the impact. In this regard, there is a problem that the criteria for calculating insurance premiums may rise.

As shown in FIG. 1, a water-cooling type condenser 10 may be a water-cooling type condenser in which a plurality of plates 20 are stacked.

The water-cooling type condenser includes a first flow portion 21 and a second flow portion 22 in which the plurality of plates 20 are stacked and through which a first heat exchange medium and a second heat exchange medium respectively flow, a first inlet pipe 31 and a first outlet pipe 32 through which the first heat exchange medium flows in/out, a second inlet pipe 41 and a second outlet pipe 42 through which the second heat exchange medium flows in/out, a gas and liquid separator 50 for separating the first heat exchange medium into a vapor heat exchange medium and a liquid heat exchange medium, a first connection pipe 51 for connecting a condensation area of the first flow portion 21 and the gas and liquid separator 50, and a second connection pipe 52 for connecting the gas and liquid separator and a subcooling area of the first flow portion 21.

In the water-cooling type condenser 10, the first heat exchange medium flowing into through the first inlet pipe 31 flows through the condensation area of the first flow portion 21, moves to the gas and liquid separator 50 through the first connection pipe 51, flows through the subcooling area of the first flow portion 21 again through the second connection pipe 52, and then is discharged through the first outlet pipe 32.

At this time, the second heat exchange medium flows into through the second inlet pipe 41 and flows in the second flow portion 22 formed by alternating with the first flow portion 21, and cools the first heat exchange medium.

However, as described above, the water-cooling type condenser accommodating the gas and liquid separator connects a separate gas and liquid separator tank, and a structure that connects the condensation area and the subcooling area with a conduit requires many additional parts for connection and occupies a lot of space. Therefore, there is a disadvantage that the water-cooling type condenser is not rational in terms of packaging and component configuration.

RELATED ART DOCUMENT

[Patent Document]
KR 2012-0061534 A (2012 Jun. 13 entitled with water-cooling type condenser)

DISCLOSURE

Technical Problem

An object of the present invention is to provide a water-cooling type condenser, wherein a fixing plate for fixing a gas and liquid separator may enable a refrigerant and cooling water to flow by means of coupling between first and second plate portions, so as to easily fix the gas and liquid separator and enable size reduction.

In addition, an object of the present invention is to provide a water-cooling type condenser comprising a fixing plate integrally formed, by brazing, with remaining components (a plate, a first inlet pipe, a first outlet pipe, a second inlet pipe, and a second outlet pipe), so as to enhance assemblability and durability and enable size reduction.

In addition, an object of the present invention is to provide a water-cooling type condenser, wherein a protruding bonding portion and a bracket fixing portion are formed on a fixing plate, the movement of a refrigerant and cooling water is possible by the protruding bonding portion, a gas and liquid separator and the fixing plate may maintain a temporary assembly state, a contact portion of a bracket also maintain the temporary assembly state by the bracket fixing portion, and then integrated by a single brazing process, so as to simplify the manufacturing process.

In addition, an object of the present invention is to provide a water-cooling type condenser capable of integrally forming both brackets extending to upper and lower sides of a vehicle by forming bracket fixing portions on the upper and lower sides, respectively.

In this case, an object of the present invention is to provide a water-cooling type condenser, wherein the fixing plate is bonded to plates between a condensation area and a supercooling area, and a gas and liquid separator and the fixing plate are connected using a first connection pipe and a second connection pipe so that the gas and liquid separator is located on one side in the width direction, so as to simplify the connection of a refrigerant pipe and to further increase manufacturability.

In addition, an object of the present invention is to provide a water-cooling type condenser, wherein a protruding bonding portion protruding from and bonded to a fixing plate is formed, the movement of a refrigerant and cooling water is possible by using the protruding bonding portion, and a gas and liquid separator and the fixing plate may maintain a temporary assembly state.

In addition, an object of the present invention is to provide a water-cooling type condenser, wherein a bending portion is formed in the fixing plate in the same direction as a stacking direction of a plate of a fixing plate so that adjacent plates may be easily seated, so as to increase a fixing force.

Technical Solution

In one general aspect, a water-cooling type condenser 1000 includes: a condensation area A1 condensing a refrigerant by heat exchanging the refrigerant and cooling water; a gas and liquid separator 400 separating gas and liquid from the refrigerant condensed in the condensation area A1; a supercooling area A3 supercooling the refrigerant by heat exchanging the refrigerant passing through the gas and liquid separator 400 and the cooling water; and a fixing plate 500 in which a first plate portion 510A corresponding to the condensation area A1 and a second plate portion 510B corresponding to the supercooling area A3 are combined to face each other, flowing the refrigerant and the cooling water and fixing a partial wall surface of the gas and liquid separator 400.

A plurality of plates 100 may be stacked to alternately form a first flow portion 100a and a second flow portion 100b through which the refrigerant and the cooling water respectively flow and form the condensation area A1 and the supercooling area A3, and the first plate portion 510A and the second plate portion 510B may have a shape corresponding to the plate 100.

The gas and liquid separator 400 may include a cylindrical body 400a, and the fixing plate 500 includes an extension portion 520 extending from each of the first plate portion 510A and the second plate portion 510B to surround an outer circumference surface of the body of the gas and liquid separator 400.

The water-cooling type condenser may further include a first inlet pipe 210 through which the refrigerant flows into and a first outlet pipe 220 through which the refrigerant is discharged; and a second inlet pipe 310 through which the cooling water flows into and a second outlet pipe 320 through which the cooling water is discharged.

The plate 100, the first inlet pipe 210, the first outlet pipe 220, the second inlet pipe 310, the second outlet pipe 320, the body of the gas and liquid separator 400, and the fixing plate 500 may be integrally formed by brazing.

The fixing plate 500 may include a protruding bonding portion 511 in which certain areas of the first plate portion 510A and the second plate portion 510B protrude to be surface-bonded to each other.

The plate 100 may include a first communication portion 111 and a second communication portion 112 having a hollow circumference protruding to one side or the other side of the plate 100 to adjust a movement flow of the refrigerant, and a third communication portion 113 and a fourth communication portion 114 having a hollow circumference protruding opposite to the protruding direction of the first communication portion 111 and the second communication portion 112 to adjust a movement flow of the cooling water.

In the plate, the first communication portion 111 and the second communication portion 112 may be located at upper and lower sides in a longitudinal direction from one side in a width direction of the plate 100, and the third communication portion 113 and the fourth communication portion 114 may be located at the upper and lower sides in the longitudinal direction from the other side in the width direction of the plate 100.

In the fixing plate 500, a plurality of protruding bonding portions 511 may be formed in the longitudinal direction of the plate 100, some protruding bonding portions 511 may be formed at locations corresponding to the first communication portion 111 to the fourth communication portion 114, and a certain area may be hollow or closed.

The gas and liquid separator 400 may include a first hollow hole 401 and a second hollow hole 402, and the refrigerant may be conveyed by a first connection pipe 410 connecting the first hollow hole 401 and one side of the protruding bonding portion 511 formed on a location corresponding to the second communication portion 112 and a second connection pipe 420 connecting the second hollow hole 402 and one side of the protruding bonding portion formed 511 on a location corresponding to the first communication portion 111.

The fixing plate 500 may include a seating groove 512 so that certain areas of the first connection pipe 410 and the second connection pipe 420 are inserted into the protruding bonding portions 511 on locations corresponding to the second communication portion 112 and the first communication portion 111.

The first connection pipe 410 and the second connection pipe 420 may include a step portion 430 having a tubal shape and protruding along an outer circumferential surface to limit an insertion depth of both ends.

The pair of protruding bonding portions 511 may be fixed to each other so as to maintain a temporary assembly state of the gas and liquid separator 400, the first connection pipe 410, the second connection pipe 420, and the fixing plate 500.

A first fixing hole 531 may be formed in the protruding bonding portion 511, and a separate fixing means 530 may be coupled through a first fixing hole 531.

A convex portion 541 having a certain protruding area may be formed on one side of the pair of protruding bonding portions 511 and a concave portion 542 into which the convex portion 541 is inserted is formed on the other side.

The fixing plate 500 may include a first bending portion 501 in which a circumference of the first plate portion 510A is bent and extends toward the condensation area A1 so that plates 100 forming the condensation area A1 are stacked and a second bending portion 502 in which a circumference of the second plate portion 510B is bent and extends toward the supercooling area A3 so that plates 100 forming the supercooling area A3 are stacked.

A refrigerant may be discharged through the first outlet pipe 220 by passing through a condensation area in which the refrigerant flowing into through the first inlet pipe 210 is condensed while passing through the first flow portion 100a, a gas and liquid separation area in which the refrigerant flows into the gas and liquid separator 400 through the first connection pipe 410 and is separated into gas and liquid refrigerants, and a supercooling area A3 in which only the separated liquid refrigerant moves through the second connection pipe 420 and is supercooled while passing through the first flow portion 100a.

Cooling water flowing into through the second inlet pipe 310 may flow through the second flow portion 100b and may be discharged through the second outlet pipe 320.

The water-cooling type condenser may further include a bracket 600 having a certain area fixed between the first plate portion 510A and the second plate portion 510B, the fixing plate 500 may include a bracket fixing portion 513 from which a certain area of the first plate portion 510A and the second plate portion 510B protrudes to fix the bracket by forming spaced spaces apart from each other by a certain distance.

The bracket 600 may include a contact portion 610 closely fixed to the spaced spaces of the bracket fixing portion 513, and a mounting portion 620 extending from the contact portion 610 for vehicle mounting.

The bracket 600 may include a mounting hole 621 with an elastic member 622 interposed in the mounting portion 620.

The bracket 600 may include a mounting pin 630 in the mounting portion 620.

The bracket fixing portions 513 may be formed on the upper and lower sides, respectively, the contact portion 610 of the bracket 600 from which the mounting portion 620 protrudes to the upper side may be fixed to the bracket fixing portion 613 on the upper side, and the contact portion 610 of the bracket 600 from which the mounting portion 620 protrudes to the lower side may be fixed to the bracket fixing portion 513 on the lower side.

The pair of bracket fixing portions 513 may be fixed to each other with the contact portion 610 therebetween.

A second fixing hole 532 may be formed in the bracket fixing portion 513, a fastening hole 641 may be formed in the contact portion 610, and a separate fastening means 640 may be fastened through the second fixing hole 532 and the fastening hole 641.

Advantageous Effects

The water-cooling type condenser of the present invention has an advantage that a fixing plate for fixing a gas and liquid separator enables a refrigerant and cooling water to flow by means of coupling between first and second plate portions, so as to easily fix the gas and liquid separator and enable size reduction.

In addition, the water-cooling type condenser of the present invention has an advantage that a fixing plate is integrally formed, by brazing, with remaining components (a plate, a first inlet pipe, a first outlet pipe, a second inlet pipe, and a second outlet pipe), so as to enhance assemblability and durability and enable size reduction.

In addition, the water-cooling type condenser of the present invention has an advantage that a protruding bonding portion and a bracket fixing portion are formed on a fixing plate, the movement of a refrigerant and cooling water is possible by the protruding bonding portion, a gas and liquid separator and the fixing plate may maintain a temporary assembly state, a contact portion of a bracket also maintains the temporary assembly state by the bracket fixing portion, and then integrated by a single brazing process, so as to simplify the manufacturing process.

In addition, the water-cooling type condenser of the present invention has an advantage of capable of integrally forming both brackets extending to upper and lower sides of a vehicle by forming bracket fixing portions on the upper and lower sides, respectively.

In this case, the water-cooling type condenser of the present invention has an advantage that the fixing plate is bonded to plates between a condensation area and a supercooling area, and a gas and liquid separator and the fixing plate are connected using a first connection pipe and a second connection pipe so that the gas and liquid separator is located on one side in the width direction, so as to simplify the connection of a refrigerant pipe and to further increase the manufacturability.

In addition, the water-cooling type condenser of the present invention has an advantage that a protruding bonding portion protruding from and bonded to a fixing plate is formed, the movement of a refrigerant and cooling water is possible by using the protruding bonding portion, and the gas and liquid separator and the fixing plate may maintain a temporary assembly state.

In addition, the water-cooling type condenser of the present invention has an advantage that a bending portion is formed in the fixing plate in the same direction as a stacking direction of a plate of a fixing plate so that adjacent plates may be easily seated, so as to increase a fixing force.

BEST MODE

Hereinafter, a water-cooling type condenser 1000 according to the present invention having the configuration as described above will be described in detail with reference to the accompanying drawings.

Figure 1:
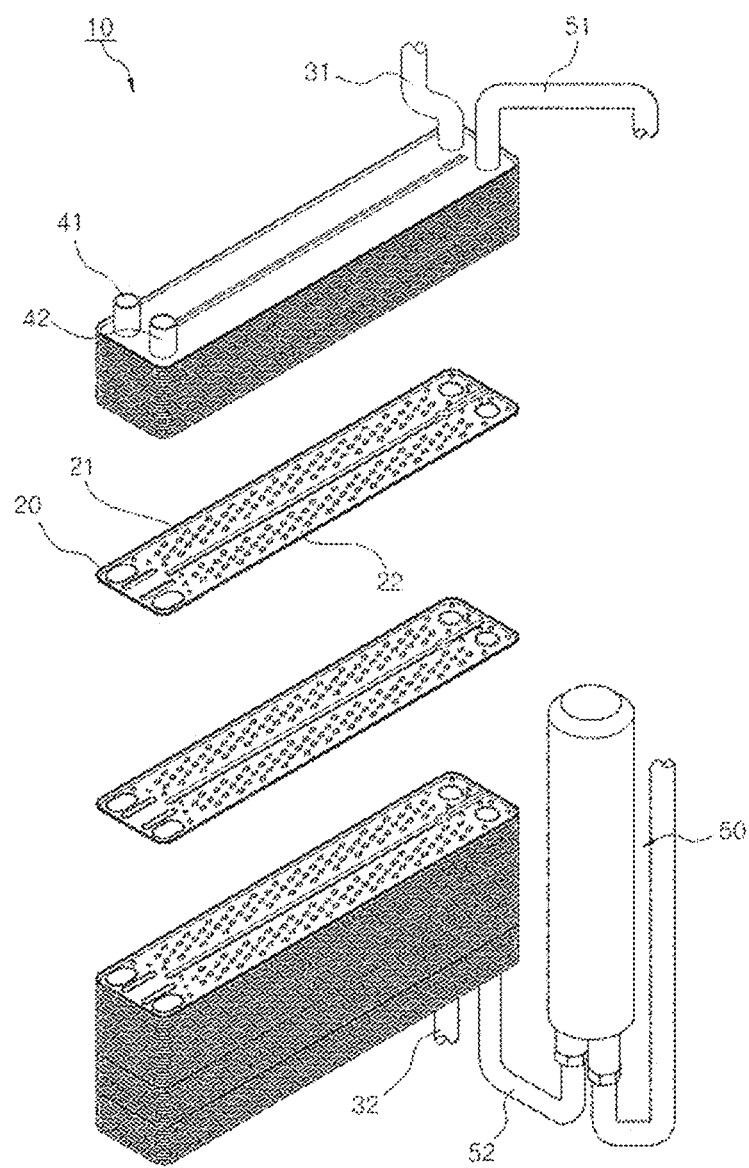
FIG. 1 is a diagram showing a water-cooling type condenser of the related art.
Figure 2:
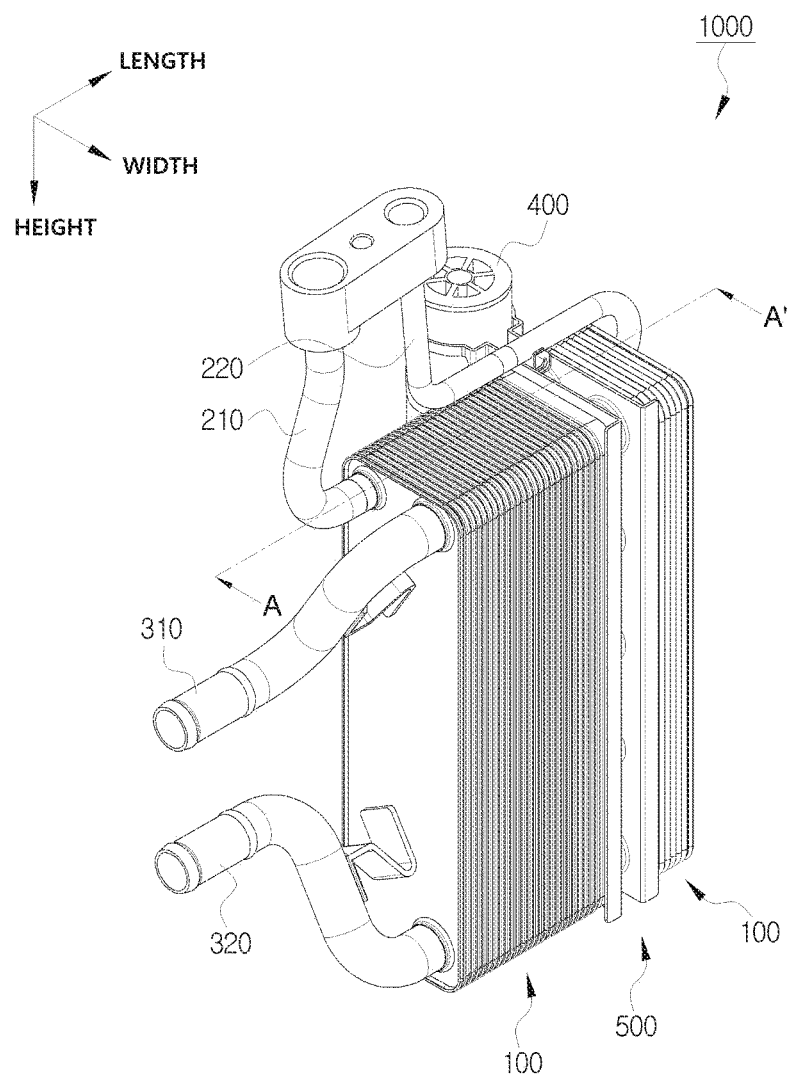
FIGS. 2 to 4 are respectively a perspective view, an exploded perspective view, and a cross-sectional view in the direction AA' of a water-cooling type condenser according to the present invention.
Figure 3:
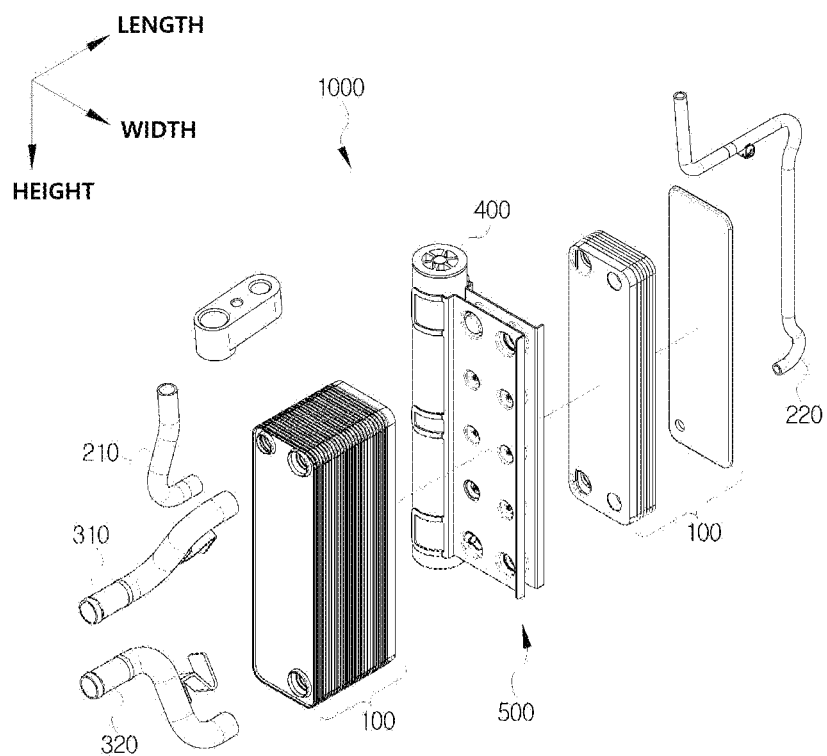
Figure 4:
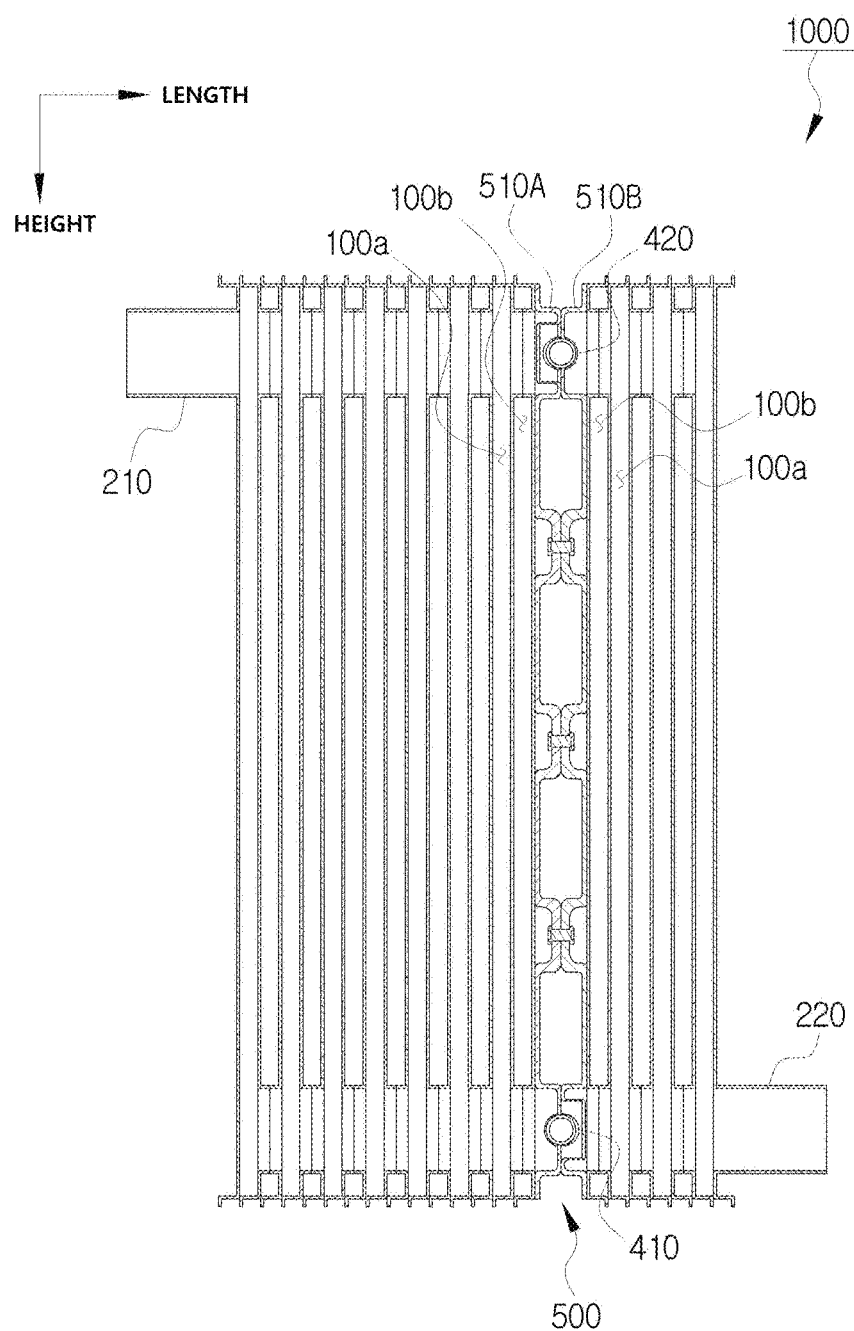
Figure 5:
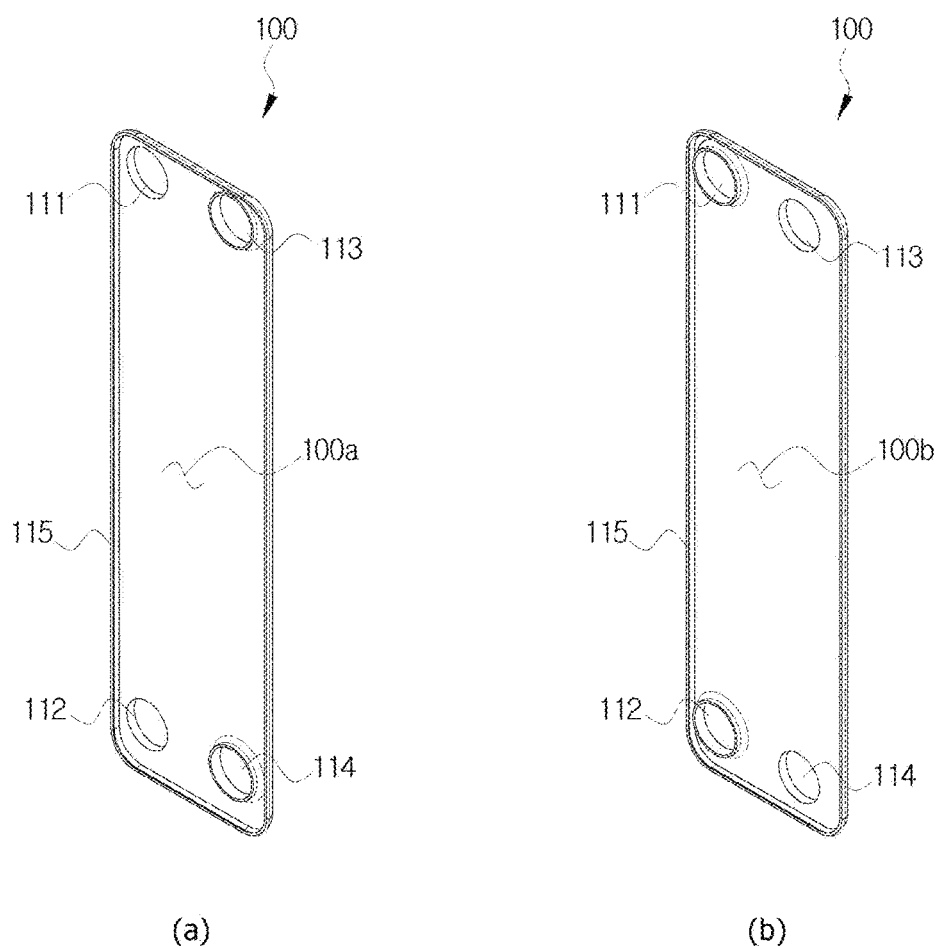
FIGS. 5 and 6 are perspective views of a plate forming a condensation area and a supercooling area, respectively.
Figure 6:
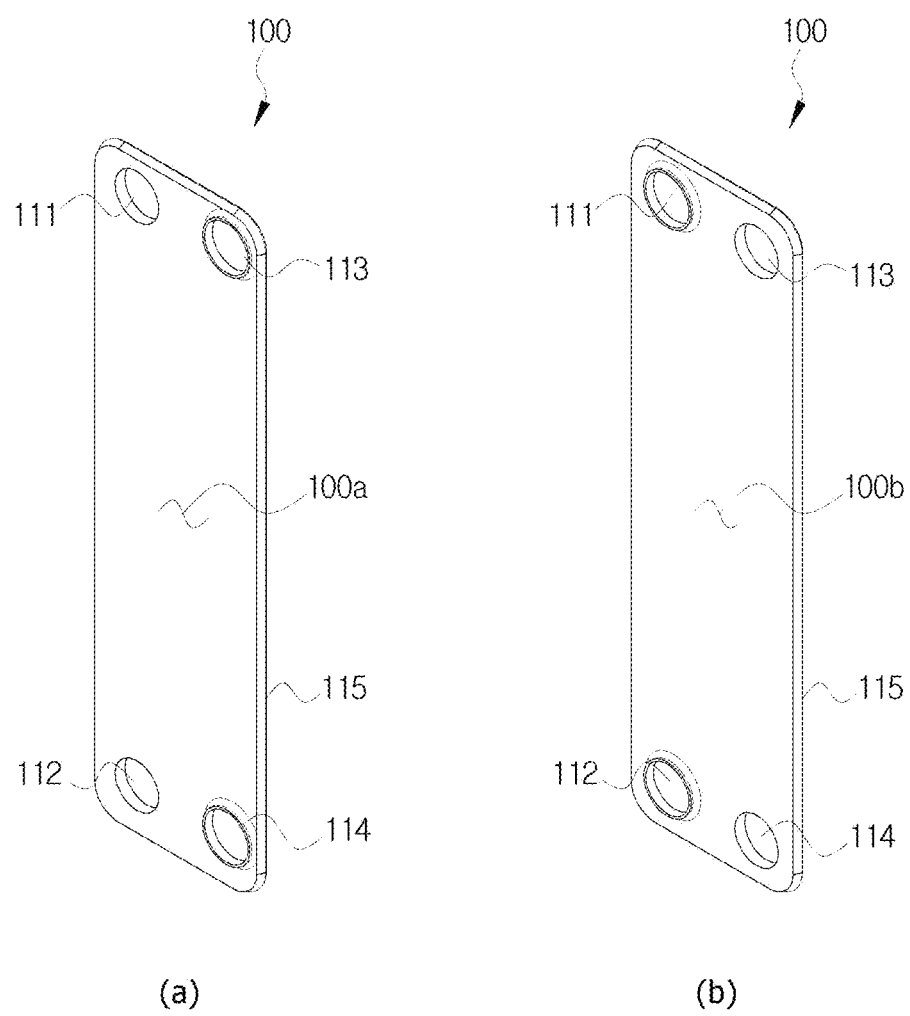
Figure 7:
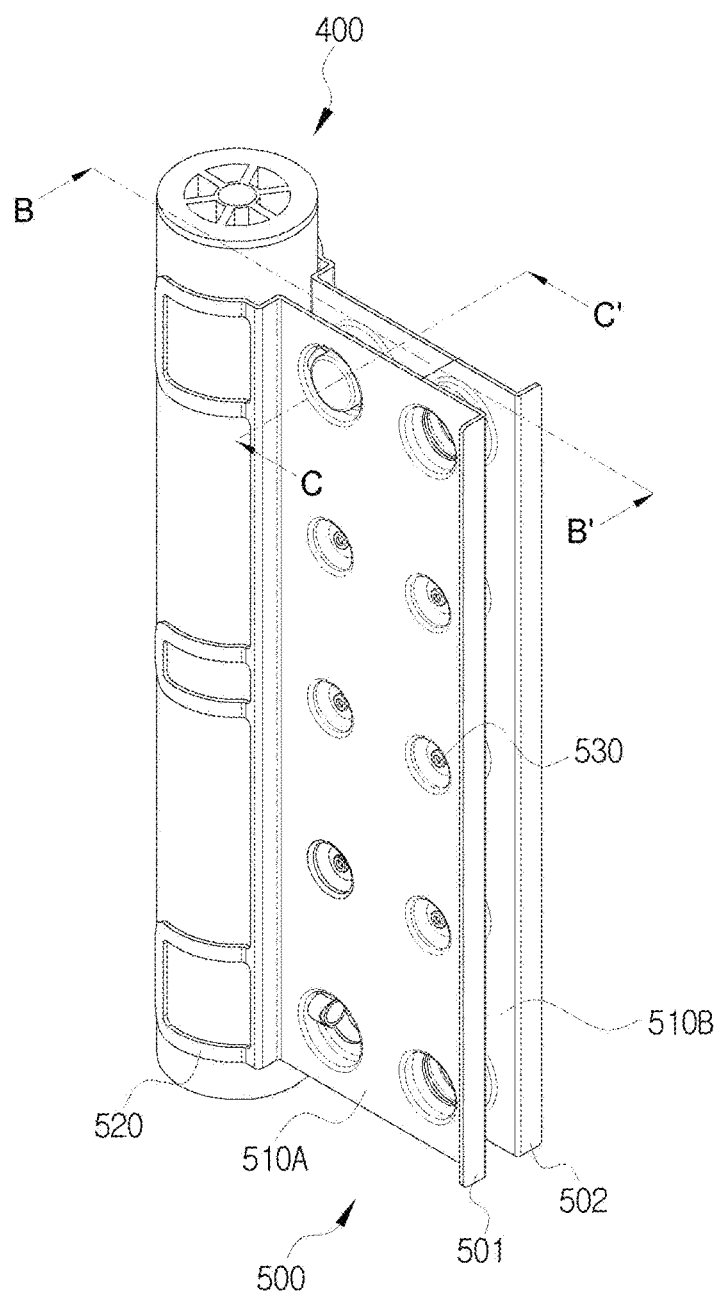
FIGS. 7 to 10 are respectively a perspective view, an exploded perspective view, a cross-sectional view in the direction BB', and a cross-sectional view in the direction CC' of an assembled state of a gas and liquid separator and a fixing plate of the water-cooling type condenser according to the present invention.
Figure 8:
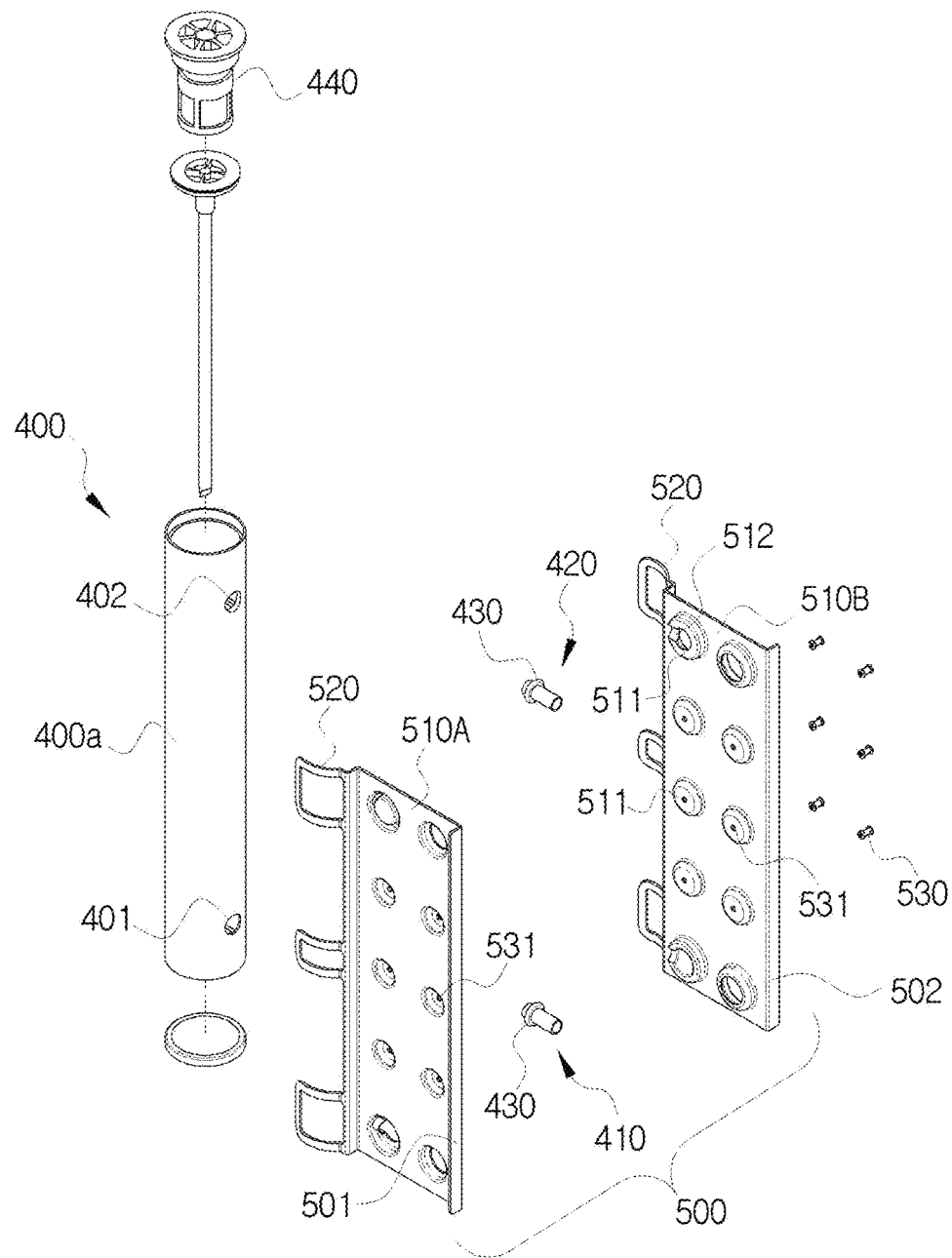
Figure 9:
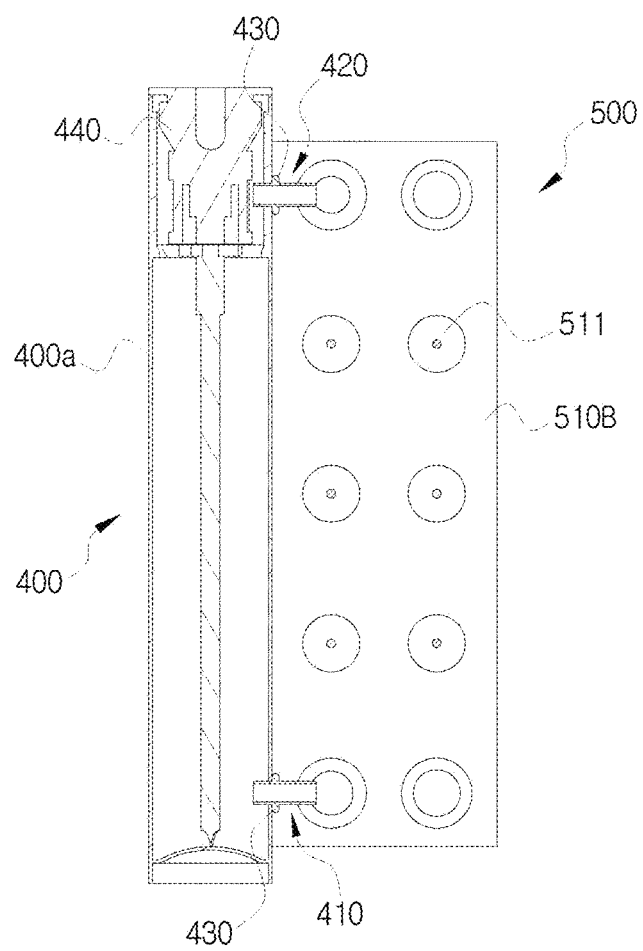
Figure 14:
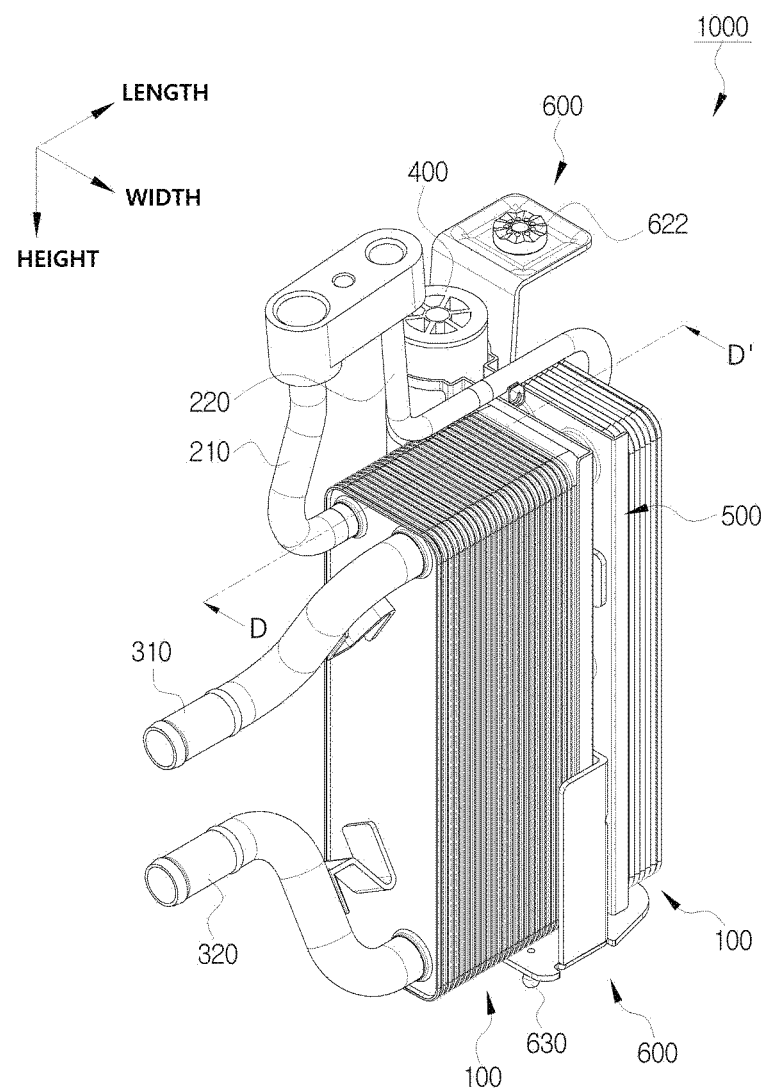
FIGS. 14 and 15 are respectively a perspective view, an exploded perspective view, and a cross-sectional view in the direction DD' of another water-cooling type condenser of the present invention.
Figure 15:
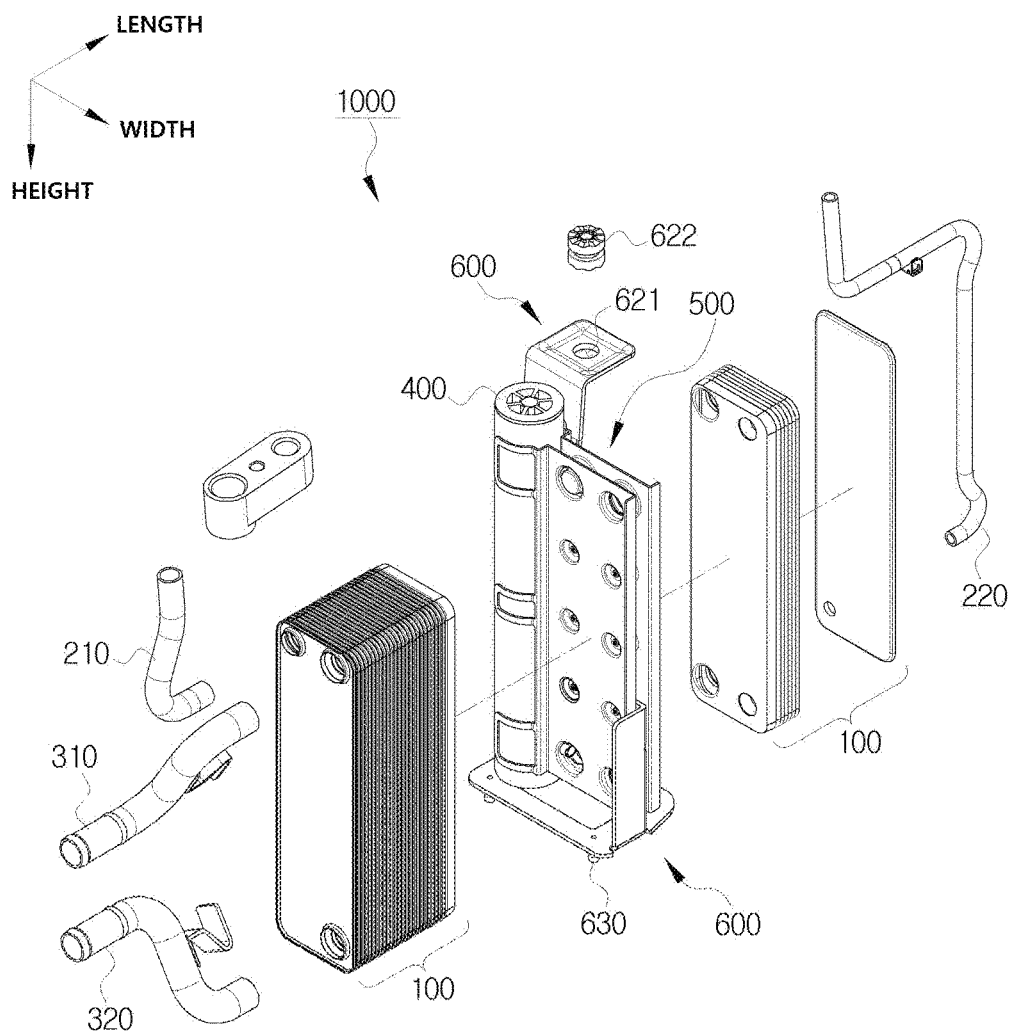
Figure 16:
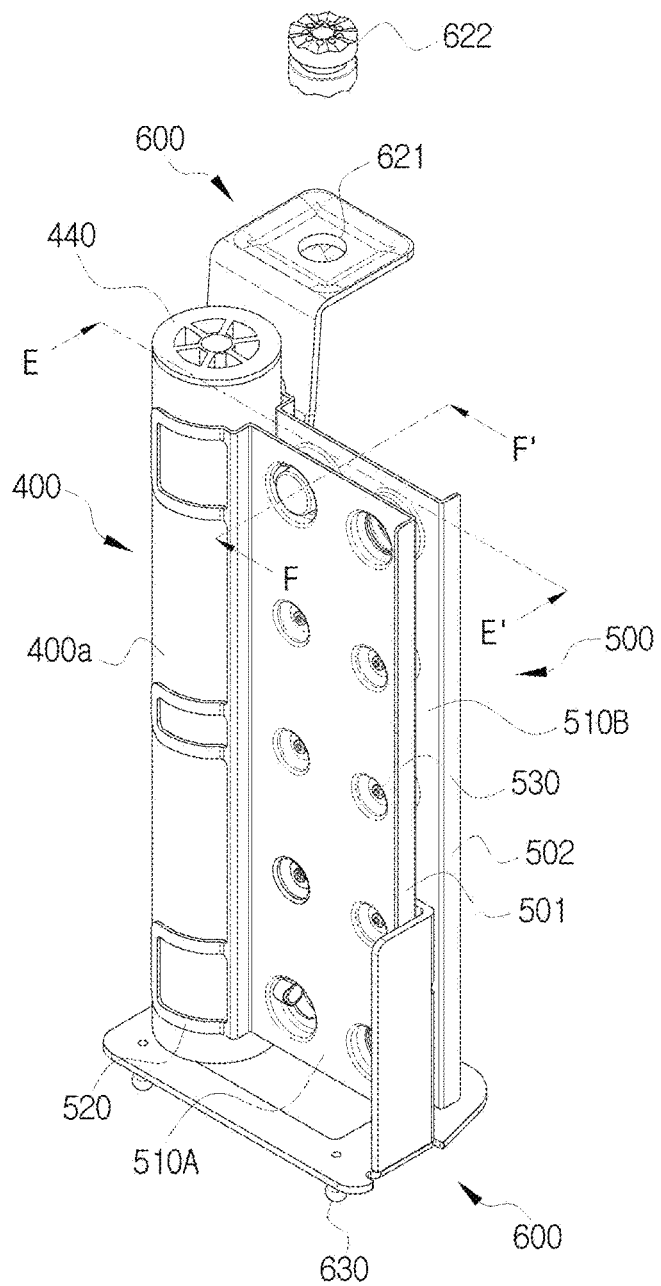
FIGS. 16 to 19 are respectively a perspective view, an exploded perspective view, a cross-sectional view in the direction EE', and a cross-sectional view in the direction FF' of an assembled state of the gas and liquid separator and the fixing plate of the water-cooling type condenser shown in FIGS. 14 and 15.
Figure 17:
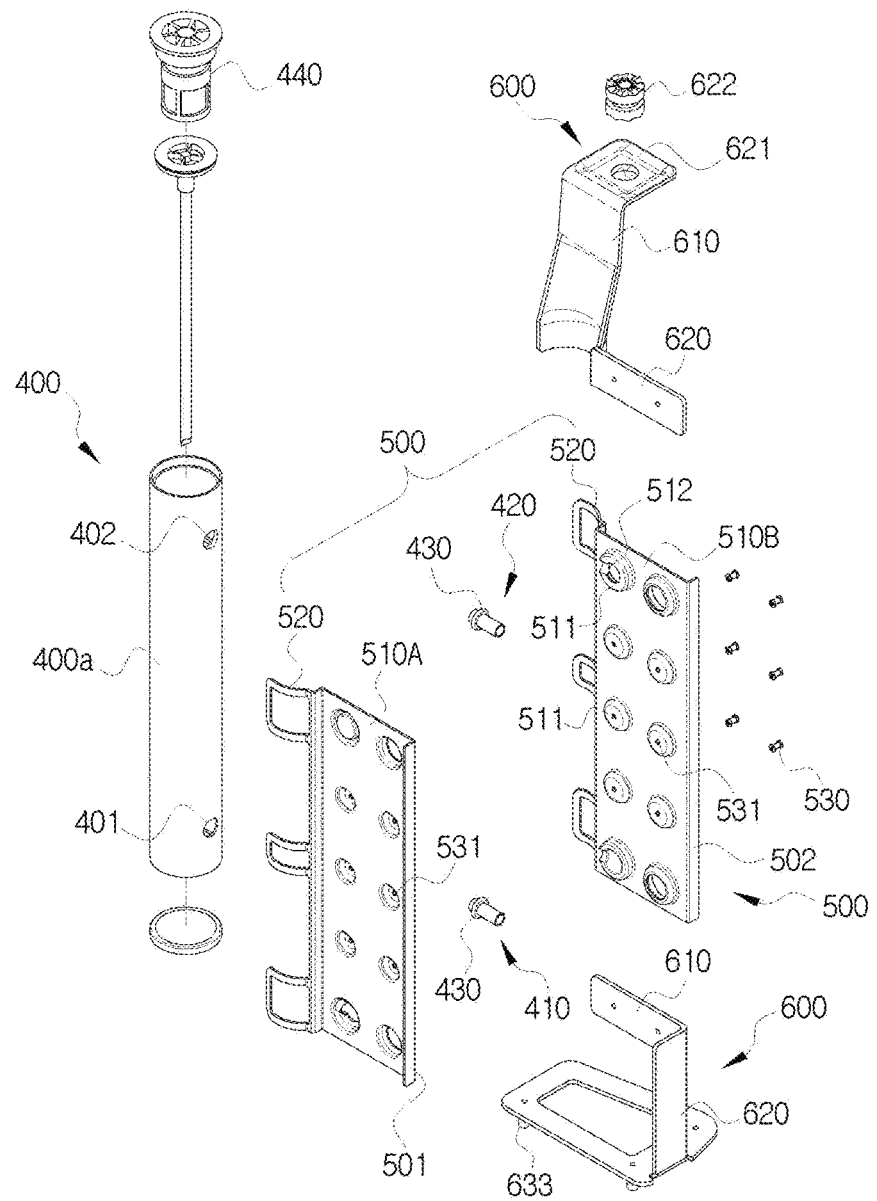
Figure 18:
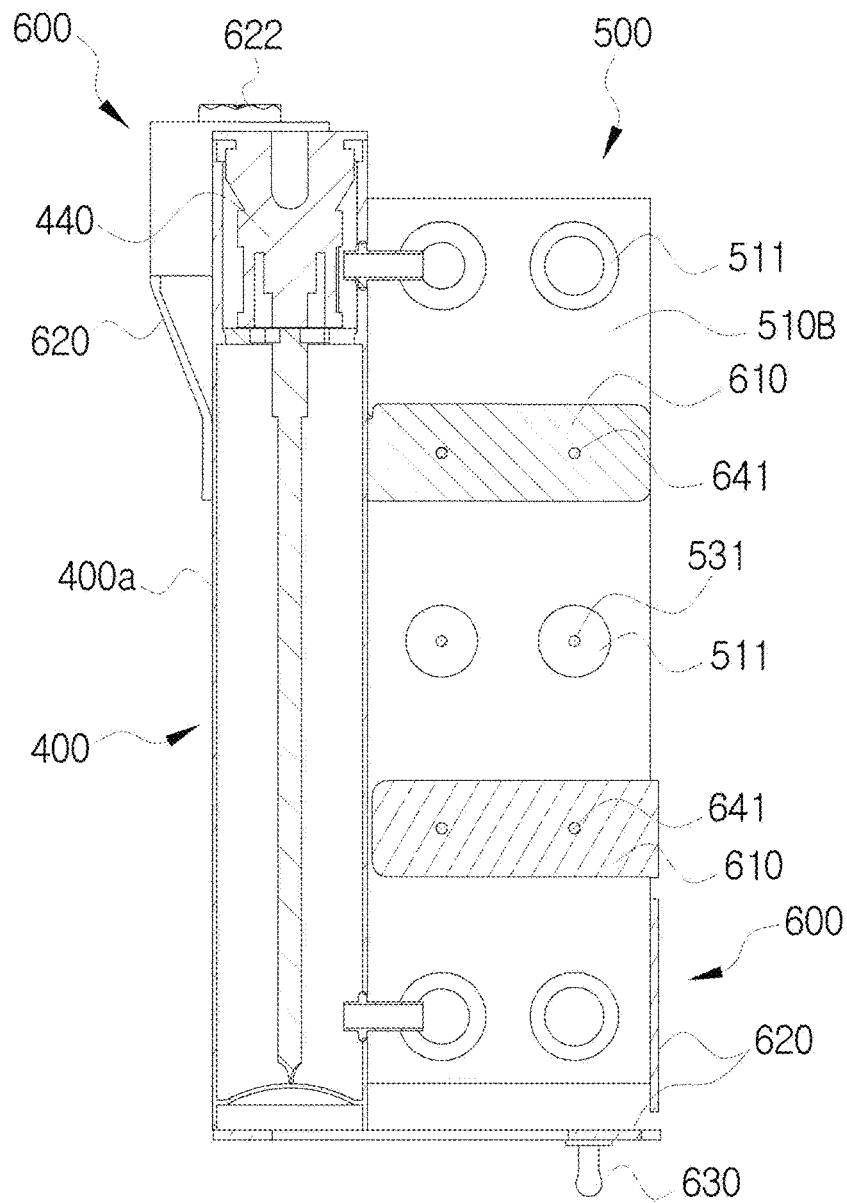
Figure 19:
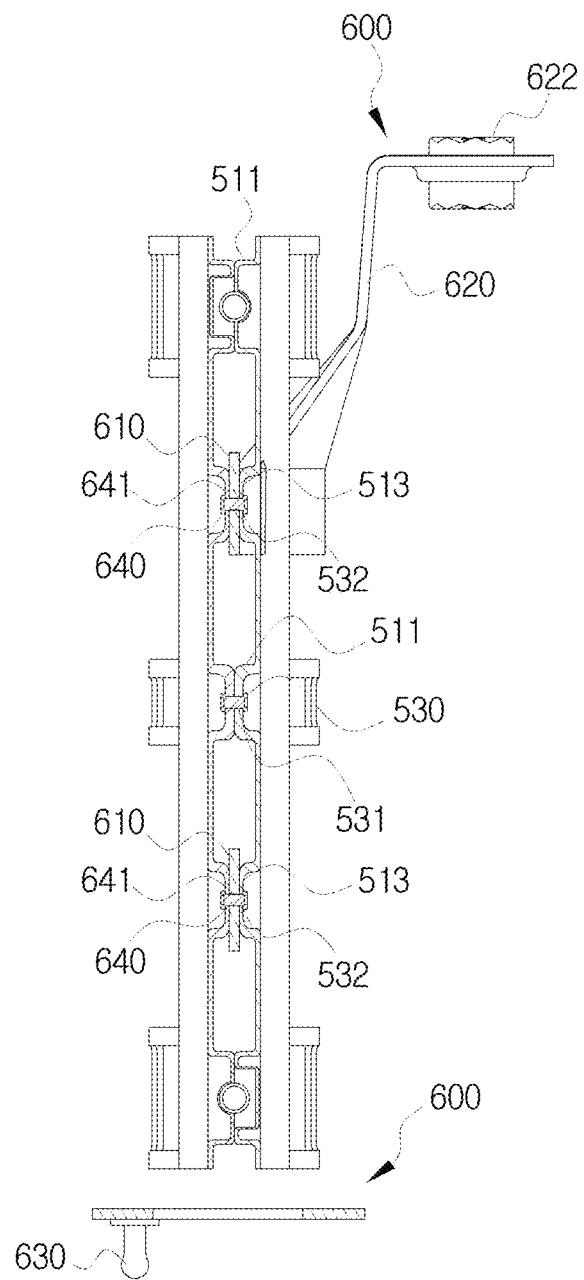

FIGS. 2 to 4 are respectively a perspective view, an exploded perspective view, and a cross-sectional view in the direction AA' of the water-cooling type condenser 1000 according to the present invention, FIGS. 5 and 6 are perspective views of a plate 100 forming a condensation area A1 and a supercooling area A3, respectively, FIGS. 7 to 10 are respectively a perspective view, an exploded perspective view, a cross-sectional view in the direction BB', and a cross-sectional view in the direction CC' of an assembled state of a gas and liquid separator 400 and a fixing plate 500 of the water-cooling type condenser 1000 according to the present invention, FIGS. 14 and 15 are respectively a perspective view, an exploded perspective view, and a cross-sectional view in the direction DD' of another water-cooling type condenser 1000 of the present invention, and FIGS. 16 to 19 are respectively a perspective view, an exploded perspective view, a cross-sectional view in the direction EE', and a cross-sectional view in the direction FF' of an assembled state of the gas and liquid separator 400 and the fixing plate 500 of the water-cooling type condenser 1000 shown in FIGS. 14 and 15.

The water-cooling type condenser 1000 of the present invention includes the condensation area A1 and a supercooling area A3 formed by the plate 100; the gas and liquid separator 400; and the fixing plate 500.

The condensation area A1 is a portion in which a plurality of plates 100 are stacked to alternately form a first flow portion 100*a* through which a refrigerant flows and a second flow portion 100*b* through which cooling water flows, wherein the cooling water is condensed while passing through the first flow portion 100*a*.

In addition, the supercooling area A3 is a portion in which the plurality of plates 100 are stacked to alternately form the first flow portion 100*a* through which the refrigerant flows and the second flow portion 100*b* through which the cooling water flows in the same manner as the condensation area A1, wherein a liquid refrigerant separated by gas and liquid flows into and is supercooled while passing through the first flow portion 100*a*.

In the plate 100, a first communication portion 111 and a second communication portion 112 which are hollow to adjust the refrigerant movement flow are formed, and a third communication portion 113 and a fourth communication portion 114 which are hollow to adjust the cooling water flow are formed. At this time, in the water-cooling type condenser 1000 of the present invention, the first communication portion 111 and the second communication portion 112 are located at the upper and lower sides in the longitudinal direction from one side in the width direction of the plate 100, the third communication portion 113 and the fourth communication portion 114 are located at the upper and lower sides in the longitudinal direction from the other side in the width direction of the plate 100, and the gas and liquid separator 400 may be located adjacent to one side in the width direction of the plate 100 on which the first communication portion 111 and the second communication portion 112 are formed for the refrigerant flow. The configurations of the fixing plate 500 and the gas and liquid separator 400 in this regard will be described again below.

The first communication portion 111 to the fourth communication portion 114 of the plate 100 may adjust the flow of the refrigerant and the cooling water by adjusting the direction in which a hollow circumference protrudes, wherein the first communication portion 111 and the second communication portion 112 protrude in the same direction, and the third communication portion 113 and the fourth communication portion 114 protrude opposite to the protruding direction of the first communication portion 111 and the second communication portion on the same plate 100.

In more detail, FIG. 5 shows the plate 100 forming the condensation area A1, wherein in the stacking direction of the plate 100 (the longitudinal direction of the water-cooling type condenser 1000), the plate 100 as shown in FIG. 5A and the plate 100 shown in FIG. 5B are alternately stacked to form the condensation area A1 in which the first flow portion 100*a* and the second flow portion 100*b* alternate in the stacking direction of the plate 100. The plate 100 shown in FIG. 5A shows an example in which the hollow circumferences of the first communication portion 111 and the second communication portion 112 protrude toward the side (right side in the drawing) where the fixing plate 500 is located and the circumferences of the third communication portion 113 and the fourth communication portion 114 protrude to the opposite side. The plate 100 shown in FIG. 5B shows an example in which the hollow circumferences of the first communication portion 111 to the fourth communication portion 114 are formed opposite to the shape shown in FIG. 5A. Accordingly, in the water-cooling type condenser 1000 of the present invention, the plate 100 shown in FIG. 5A and the plate 100 shown in FIG. 5B are alternately stacked so that the protruding areas of the hollow circumferences of the first communication portion 111 to the fourth communication portion 114 are bonded to each other. In addition, a first flow portion 100*a* is formed on the left side of the plate 100 shown in FIG. 5A so that the refrigerant moves to the other first flow portion 100*a* through the first flow portion 100*a* and the second flow portion 100*b*, and a second flow portion 100*b* is formed on the left side of the plate 100 shown in FIG. 5B so that the cooling water moves to the other second flow portion 100*b* through the third communication portion 113 and the fourth communication portion 114. In addition, in the plate 100 forming the condensation area A1, a circumference portion 115 protrudes to be stacked and combined in the longitudinal direction of the plate 100 to the opposite side (left side in the drawing) where the fixing plate 500 is located.

In addition, FIG. 6 shows the plate 100 forming the supercooling area A3, wherein in the stacking direction of the plate 100, the plate 100 shown in FIG. 6A and the plate 100 shown in FIG. 6B are alternately stacked to form the supercooling area A3 in which the first flow portion 100*a* and the second flow portion 100*b* alternate in the stacking direction of the plate 100. The plate 100 shown in FIGS. 6A and 6B show an example in which the hollow circumference of the first communication portion 111 to the fourth communication portion 114 are the same as the shape shown in FIGS. 5A and 5B. In the supercooling area A3, the plate 100 shown in FIG. 6A and the plate 100 shown in FIG. 6B are alternately stacked so that the protruding areas of the hollow circumferences of the first communication portion 111 to the fourth communication portion 114 are bonded to each other. In addition, the first flow portion 100*a* is formed on the left side of the plate 100 shown in FIG. 6A so that the refrigerant moves to the other first flow portion 100*a* through the first communication portion 111 and the second communication portion 112, and the second flow portion 100*b* is formed on the left side of the plate 100 shown in FIG. 6B so that the cooling water moves to the other second flow portion 100*b* through the third communication portion 113 and the fourth communication portion 114. In addition, in the plate 100 forming the supercooling area A3, the circumference portion 115 protrudes to be stacked and combined in the longitudinal direction of the plate 100 to the opposite side (right side in the drawing) where the fixing plate 500 is located. That is, in the water-cooling type condenser 1000 of the present invention, the circumference portions 115 of the plate 100 forming the condensation area A1 and the supercooling area A3 are stacked in a manner that the circumference portions 115 protrudes to the opposite side of the fixing plate 500.

The water-cooling type condenser 1000 of the present invention includes a first inlet pipe 210 into which the refrigerant flows and a first outlet pipe 220 through which the refrigerant is discharged; a second inlet pipe 310 into which the cooling water flows and a second outlet pipe 320 through which the cooling water is discharged.

The first inlet pipe 210 is a portion connected to one of the first communication portion 111 and the second communication portion 112 through which the refrigerant flows and into which the refrigerant flows, and the first outlet pipe 220 is a portion connected to one of the first communication portion 111 and the second communication portion 112 and through which the refrigerant is discharged.

The second inlet pipe 310 is a portion connected to one of the third communication portion 113 and the fourth communication portion 114 through which the cooling water flows and into which the cooling water flows, and the second outlet pipe 320 is a portion connected to one of the third communication portion 113 and the fourth communication portion 114 and through which the cooling water flows.

FIGS. 2 and 3 show an example in which the first inlet pipe 210 is connected to the first communication portion 111 on one side (left side) in the longitudinal direction, the first outlet pipe 220 is connected to the second communication portion 112 on the other side (right side) in the longitudinal direction, and the second inlet pipe 310 and the second outlet pipe 320 are respectively connected to the third communication portion 113 and the fourth communication portion 114 on one side (left side) in the longitudinal direction, but locations of the first inlet pipe 210, the first outlet pipe 220, the second inlet pipe 310, and the second outlet pipe 320 may be formed in more various ways according to the flow of inner refrigerant and cooling water.

The gas and liquid separator 400 is a portion located on one side in the width direction of the plate 100 on the side where the first communication portion 111 and the second communication portion 112 are formed. The refrigerant passing through the condensation area A1 moves and is separated by gas and liquid, and then moves to the supercooling area A3. The gas and liquid separator 400 has a cylindrical shape with one side open, includes a body 400a formed of the same material as the plate 100 and the fixing plate 500. The body 400a is assembled by brazing together with the plate 100 and the fixing plates 500, a drying material or a filter is embedded therein, and then open one side may be closed by a cap portion 440. Through this, in the water-cooling type condenser 1000 of the present invention, the fixing plate 500 is integrally formed, by brazing, with remaining components (a plate, the first inlet pipe 210, the first outlet pipe 220, the second inlet pipe 310, and the second outlet pipe 320), so as to enhance assemblability and durability and enable size reduction.

In the present invention, the meaning of being integrally formed by brazing means that all the remaining configurations are brazed except for a drying material, the filter, the cap portion 440, etc. that are embedded in the body 400a of the gas and liquid separator 400 which is a material that is not brazed.

The fixing plate 500 has a plate shape corresponding to the plate 100 and includes a first plate portion 510A and a second plate portion 510B located between the condensation area A1 and the supercooling area A3. In this case, the first plate portion 510A has a plate shape corresponding to the condensation area A1, and the second plate portion 510B has a plate shape corresponding to the supercooling area A3. In addition, each of the first plate portion 510A and the second plate portion 510B includes an extension portion 520 extending to surround the outer peripheral surface (the outer peripheral surface of the body 400a) of the gas and liquid separator 400. The first plate portion 510A and the second plate portion 510B are portions bonded to the adjacent plate 100 by brazing, and a protruding bonding portion 511 is formed between the pair of plate portions 510.

The protruding bonding portion 511 is a portion protruding so that a certain area of the first plate portion 510A and the second plate portion 510B are in contact with and bonded to each other. A plurality of protruding bonding portions 511 are formed in the longitudinal direction of the plate 100 while some of the protruding bonding portions 511 are formed on locations corresponding to the first communication portions 111 to the fourth communication portions 114, and a certain area of the protruding bonding portions 511 of the locations corresponding to the first communication portions 111 to the fourth communication portions 114 is hollow or closed to control the flow of the refrigerant and cooling water. In more detail, in FIG. 8, the protruding bonding portion 511 on the location corresponding to the second communication portion 112 is a portion where the refrigerant passing through the first flow portion 100a of the condensation area A1 flows into and is conveyed to the gas and liquid separator 400, and the protruding bonding portion 511 on the location corresponding to the first communication portion 111 is a portion where the refrigerant passing through the gas and liquid separator 400 flows into and is conveyed to the supercooling area A3. To form such a flow, the left side of the protruding bonding portion 511 among the pair of fixing plates 500 on the location corresponding to the second communication portion 112 is opened and the right side is closed. In addition, the left side of the protruding bonding portion 511 among the pair of fixing plates 500 on the location corresponding to the first communication portion 111 is closed and the right side is opened.

At this time, in order to move the refrigerant between the fixing plate 500 and the gas and liquid separator 400, the gas and liquid separator 400 includes a first hollow hole 401 and a second hollow hole 402 and a first connection pipe 410 fixed to the first hollow hole 401 and a second connection pipe 420 fixed to the second hollow hole 402. The first connection pipe 410 connects the first hollow hole 401 to one side of the protruding bonding portion 511 formed on the location corresponding to the second communication portion 112. The first connection pipe 410 is connected to the outer circumferential surface of an area in which the refrigerant moves formed as the protruding bonding portions 511 protrude and are joined to each other, and a seating groove 512 in which the first connection pipe 410 is seated is formed in the protruding bonding portion 511. In addition, the second connection pipe 420 connects the second hollow hole 402 and one side of the protruding bonding portion 511 formed on the location corresponding to the first communication portion 111, and the seating groove 512 in which the second connection pipe 420 is seated is formed in the protruding bonding portion 511 to which the second connection pipe 420 is connected.

In addition, the first connection pipe 410 and the second connection pipe 420 forms a stepped portion 430 having a tube shape in which the inside is hollow while protruding along the outer circumferential surface. Through this, the water-cooling type condenser 1000 of the present invention may limit the insertion depth of both ends of the first connection pipe 410 and the second connection pipe 420, thereby preventing misassembling.

In addition, the fixing plate 500 forms a space in which the protruding bonding portions 511 corresponding to the locations at which the third communication portion 113 and the fourth communication portion 114 are formed are bonded to each other, and the inside is hollow so that the cooling water passing through the second flow portion 100b of the condensation area A1 is conveyed to the second flow portion 100b of the supercooling area A3.

Meanwhile, in the water-cooling type condenser 1000 of the present invention, the plurality of protruding bonding portions 511 are formed in the longitudinal direction of the plate 100 so that some protruding bonding portions 511 enable the gas and liquid separator 400, the first connection pipe 410, the second connection pipe 420, and the fixing plate 500 to maintain a temporary assembly state. In particular, it is preferable that the protruding bonding portion 511 for temporary assembly is a configuration located at the center in the longitudinal direction of the plate 100.

Figure 10:
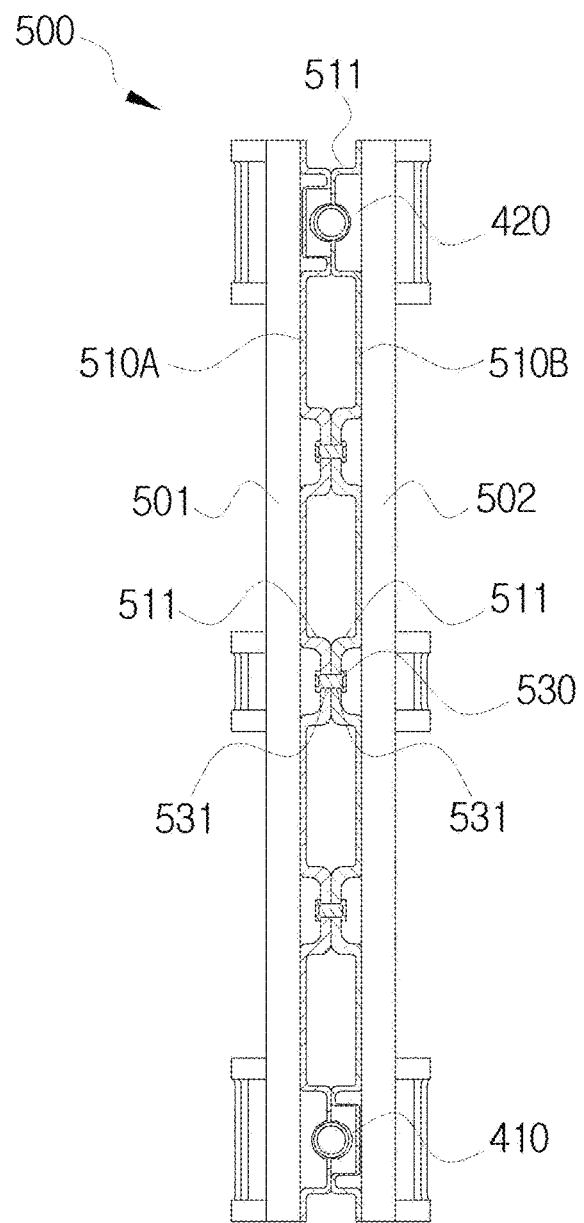

An example in which a first fixing hole 531 is formed in the protruding bonding portion 511 and a separate fixing means 530 is coupled through the first fixing hole 531 as a method for maintaining the temporary assembly state is shown in FIG. 10. The fixing means 530 may use a means coupled in the form of a bolt or a nut, or a means such as a rivet.

Figure 11:
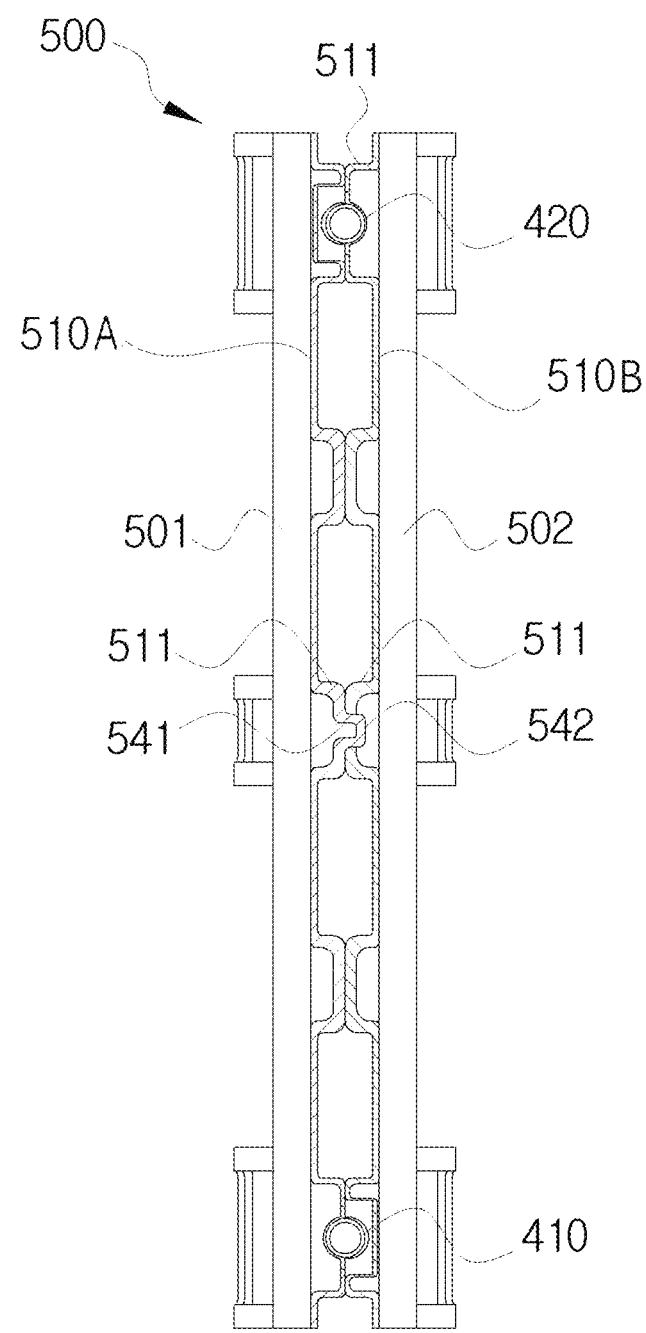
FIG. 11 is another view showing an assembly state of a gas and liquid separator and a fixing plate of the water-cooling type condenser according to the present invention.

FIG. 11 is another view showing an assembly state of the gas and liquid separator 400 and the fixing plate 500 of the water-cooling type condenser 1000 according to the present invention. As shown in FIG. 11, as another method for maintaining the temporary assembly state, a convex portion 541 that protrudes is formed on one side of a pair of protruding bonding portions 511, and a concave portion 542 that is concave into which the convex portion 541 is inserted is formed in the other side so that the convex portion 541 is forcibly assembled to the concave portion 542.

The water-cooling type condenser 1000 of the present invention is manufactured in that first, the first connection pipe 410, the second connection pipe 420, the gas and liquid separator 400, the body 400a, and the fixing plate 500 are temporarily assembled, and the temporarily assembled configuration is coupled with the plate 100, the first inlet pipe 210, the first outlet pipe 220, the second inlet pipe 310, and the second outlet pipe 320 by brazing, and then a drying material, a filter, and the cap portion 440 are mounted on the gas and liquid separator 400. Accordingly, the water-cooling type condenser 1000 of the present invention may further increase assemblability and productivity, and may the advantage of enabling size reduction by integrally forming the gas and liquid separator 400 in a simple form using the fixing plate 500.

In addition, in the water-cooling type condenser 1000 of the present invention, a first bending portion 501 in which the circumference of the first plate portion 510A is bent and extends toward the condensation area A1 so that the plates 100 forming the condensation area A1 are stacked and a second bending portion 502 in which the circumference of the second plate portion 510B is bent and extends toward the supercooling area A3 so that the plates 100 forming the supercooling area A3 are stacked may be further formed such that the plates 100 adjacent to the fixing plate 500 are stacked to bonded to each other. In the water-cooling type condenser 1000 of the present invention, the circumference portions 115 of the plates 100 forming the condensation area A1 and the supercooling area A3 protrude toward the opposite side of the fixing plate 500, and the first bending portion 501 and the second bending portion 502 protrude in the same direction as the protruding direction of the circumference portion 115 of the adjacent plates 100, respectively. That is, the first plate portion 510A adjacent to the condensation area A1 is bent and extends so that the first bending portion 501 wraps around the plate 100 forming the condensation area A1 to be bonded to each other, and the second plate portion 510B adjacent to the supercooling area A3 is bent and extends so that the second bending portion 502 wraps the plate 100 forming the supercooling area A3 to be joined to each other. Through this, the water-cooling type condenser 1000 of the present invention may further increase a bonding area between the fixing plate 500 and the plate 100 to increase durability, and prevent the plate 100 from being spaced apart during a brazing process to further increase manufacturability.

Figure 12:
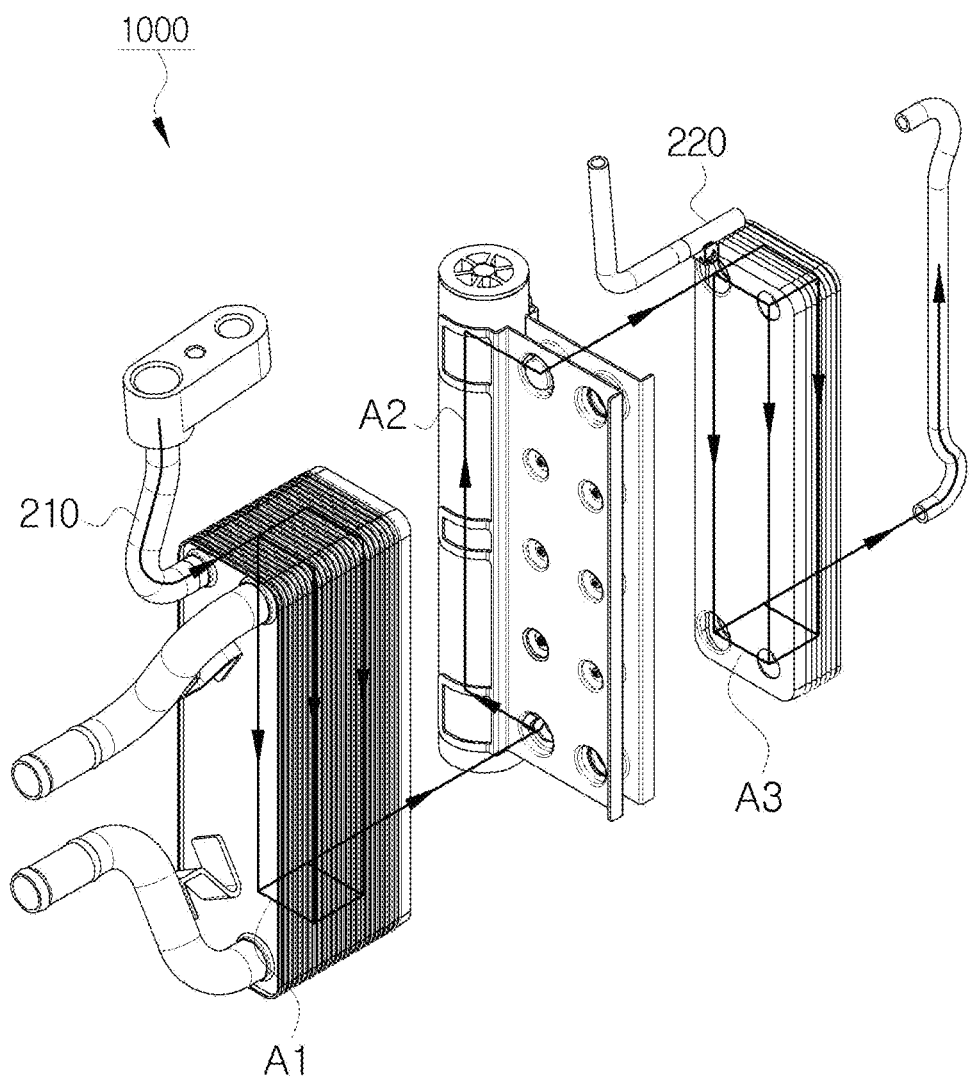
FIG. 12 is a diagram showing the flow of a refrigerant in the water-cooling type condenser according to the present invention.

FIG. 12 is a diagram showing the flow of a refrigerant in the water-cooling type condenser 1000 according to the present invention. In the water-cooling type condenser 1000, the refrigerant is discharged through the first outlet pipe 220 by passing through the condensation area A1 in which the refrigerant flowing into through the first inlet pipe 210 is condensed while passing through the first flow portion 100a, a gas and liquid separation area A2 in which the refrigerant flows into the gas and liquid separator 400 through the first connection pipe 410 and is separated into gas and liquid refrigerants, and the supercooling area A3 in which only the separated liquid refrigerant moves through the second connection pipe 420 and is supercooled while passing through the first flow portion 100a.

Figure 13:
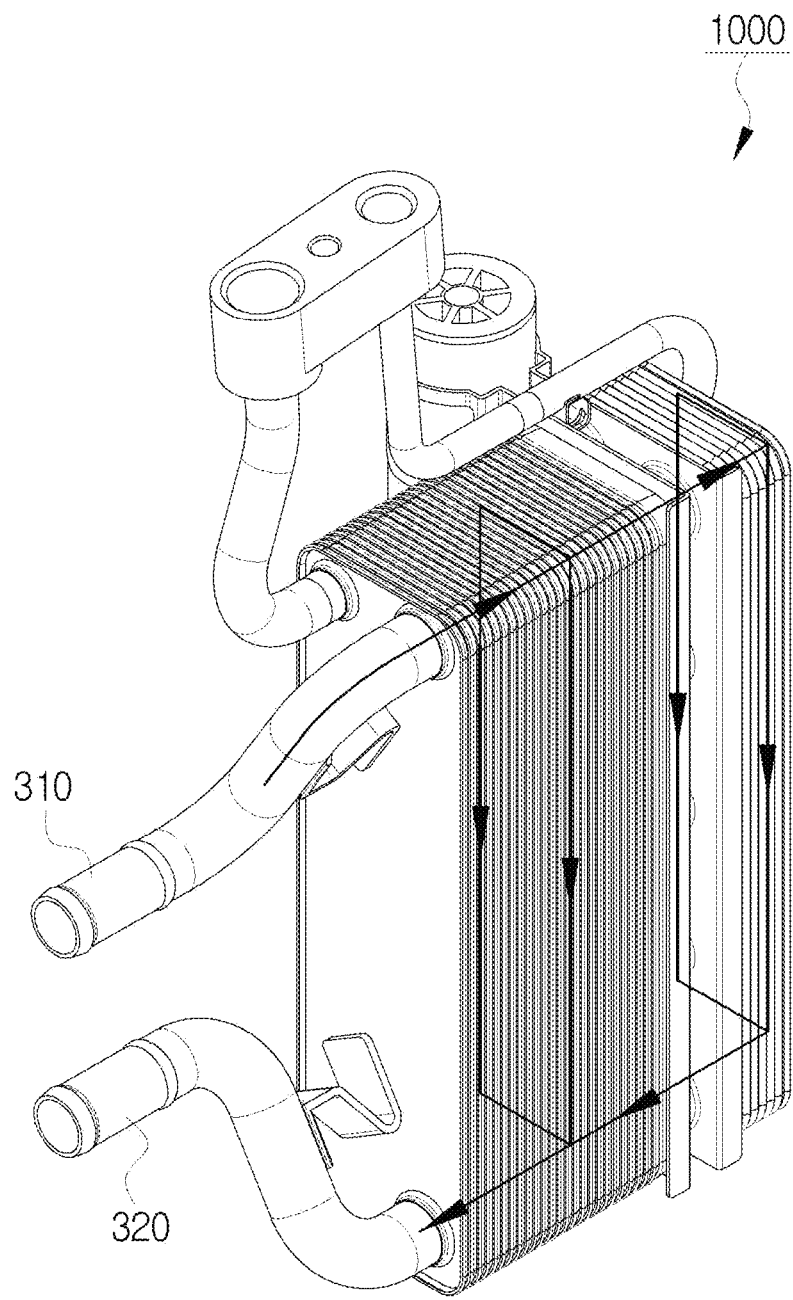
FIG. 13 is a diagram showing the flow of cooling water in the water-cooling type condenser according to the present invention.

FIG. 13 is a diagram showing the flow of cooling water in the water-cooling type condenser 1000 according to the present invention. In the water-cooling type condenser 1000, the cooling water flowing into through the second inlet pipe 310 flows through the second flow portion 100b and is discharged through the second outlet pipe 320. More specifically, the refrigerant passing through the second flow portion 100b of the condensation area A1 moves to the second flow portion 100b of the supercooling area A3 through the hollow area of the protruding bonding portions 511 of the locations corresponding to the third communication portion 113 and the fourth communication portion 114.

Also, additionally, the water-cooling type condenser 1000 of the present invention may further include a bracket 600 for vehicle mounting.

In this case, in the fixing plate 500, a bracket fixing portion 513 from which a certain area of the first plate portion 510A and the second plate portion 510B protrudes to fix the bracket 600 is formed by forming spaced spaces apart from each other by a certain distance.

In the bracket 600, a contact portion 610 that is closely adhered and fixed to the spaced spaces between the bracket fixing portions 513, and a mounting portion 620 extending from the contact portion 610 and having a shape for being mounted on a vehicle are formed. The mounting portion 620 of the bracket 600 is a configuration for mounting the water-cooling type condenser 1000 on the vehicle, and may be fixed to a carrier forming a front end module of the vehicle. The bracket 600 may be in the form in which a mounting hole 621 through which an elastic member 622 is interposed may be formed in the mounting portion 620, or a mounting pin 630 may be formed on the mounting portion 620.

That is, the bracket fixing portion 513 is a configuration for integrally forming the bracket 600 in the water-cooling type condenser 1000. The contact portion 610 of the bracket 600 is fixed to the spaced space formed by the bracket fixing portion 513 and then integrally formed by brazing.

At this time, the water-cooling type condenser 1000 may include a pair of bracket fixing portions 513 formed on the upper and lower sides, respectively, and including the mounting portion 620 in which the brackets 600 extend to the upper and lower sides, respectively. That is, the contact portion 610 of the bracket 600 from which the mounting portion 620 protrudes to the upper side is fixed to the bracket fixing portion 513 on the upper side, and the contact portion 610 of the bracket 600 from which the mounting portion 620 protrudes to the lower side is fixed to the bracket fixing portion 513 on the lower side.

FIGS. 14 to 19 show an example in which the protruding bonding portions 511 are formed in three places in the height direction on the fixing plate 500, the bracket fixing portion 513 is formed between the protruding bonding portions 511, the contact portion 610 of the upper bracket 600 including the mounting portion 620 in which the mounting hole 621 is formed in the upper bracket fixing portion 513 is fixed, and the contact portion 610 of the lower bracket 600 including the mounting portion 620 in which the mounting pin 630 is formed in the lower bracket fixing portion 513 is fixed.

In the water-cooling type condenser 1000 of the present invention, the number of brackets 600 and the mounting portion 620 may also have more various forms.

Meanwhile, in the water-cooling type condenser 1000, the pair of bracket fixing portions 513 are fixed to each other with the contact portion 610 interposed therebetween to increase the fixing force of the bracket 600, and it is preferable to maintain the temporary assembly state. In a specific method, a second fixing hole 532 is formed in the bracket fixing portion 513, a fastening hole 641 is formed in the contact portion 610, and a separate fastening means 640 may be fastened through the second fixing hole 532 and the fastening hole 641.

In the water-cooling type condenser 1000 of the present invention, the bracket 600 is assembled together in the temporary assembly of the first connection pipe 410, the second connection pipe 420, the gas and liquid separator 400, the body 400a, and the fixing plate 500 and is integrally coupled by brazing. In addition, if the bracket 600 has an elastic member 622 interposed in the mounting hole 621, the elastic member 622 is mounted. Accordingly, the water-cooling type condenser 1000 of the present invention may further increase assemblability and productivity, and may integrally form the gas and liquid separator 400 and the bracket 600 in a simple form using the fixing plate 500 to increase manufacturability, and enable size reduction.

The present invention is not limited to the above-described embodiments, and may be variously applied. In addition, the present invention may be variously modified by those skilled in the art to which the present invention pertains without departing from the spirit of the present invention claimed in the claims.

DESCRIPTION OF REFERENCE NUMERALS

1000: water-cooling type condenser
100: plate
100a: first flow portion (refrigerant)
100b: second flow portion (cooling water)
111: first communication portion
112: second communication portion
113: third communication portion
114: fourth communication portion
115: circumference portion
210: first inlet pipe
220: first outlet pipe
310: second inlet pipe
320: second outlet pipe
400: gas and liquid separator
400a: body
401: first hollow hole
402: second hollow hole
410: first connection pipe
420: second connection pipe
430: step portion
440: cap portion
500: fixing plate
501: first bending portion
502: second bending portion
510A: first plate portion
510B: second plate portion
511: protruding bonding portions (bonded to each other)
512: seating groove
513: protruding fixing portion (configuration for fixing bracket)
520: extension portion
530: fixing means
531: first fixing hole
532: second fixing hole
541: convex portion
542: concave portion
600: bracket
610: contact portion
620: mounting portion
621: mounting hole
622: elastic member
630: mounting pin
640: fastening means
641: fastening hole
A1: condensation area
A2: gas and liquid separation area
A3: supercooling area

The invention claimed is:

1. A water-cooling type condenser comprising:
a condensation area condensing a refrigerant by heat exchanging the refrigerant and cooling water;
a gas and liquid separator separating gas and liquid from the refrigerant condensed in the condensation area;
a supercooling area supercooling the refrigerant by heat exchanging the refrigerant passing through the gas and liquid separator and the cooling water; and
a fixing plate in which a first plate portion corresponding to the condensation area and a second plate portion corresponding to the supercooling area are combined to face each other, flowing the refrigerant and the cooling water and fixing a partial wall surface of the gas and liquid separator,
wherein a plurality of plates are stacked to alternately form a first flow portion and a second flow portion through which the refrigerant and the cooling water respectively flow and form the condensation area and the supercooling area,
wherein the first plate portion and the second plate portion have a shape corresponding to the plate, wherein the gas and liquid separator includes a cylindrical body, wherein the fixing plate includes an extension portion extending from each of the first plate portion and the second plate portion to surround an outer circumference surface of the body of the gas and liquid separator, and wherein the fixing plate includes a protruding bonding portion in which certain areas of the first plate portion and the second plate portion protrude to be surface-bonded to each other.

2. The water-cooling type condenser of claim 1, further including:

a first inlet pipe through which the refrigerant flows into and a first outlet pipe through which the refrigerant is discharged; and a second inlet pipe through which the cooling water flows into and a second outlet pipe through which the cooling water is discharged.

3. The water-cooling type condenser of claim 2, wherein the plate, the first inlet pipe, the first outlet pipe, the second inlet pipe, the second outlet pipe, the body of the gas and liquid separator, and the fixing plate are integrally formed by brazing.

4. The water-cooling type condenser of claim 1, wherein the plate includes a first communication portion and a second communication portion having a hollow circumference protruding to one side or the other side of the plate to adjust a movement flow of the refrigerant, and a third communication portion and a fourth communication portion having a hollow circumference protruding opposite to the protruding direction of the first communication portion and the second communication portion to adjust a movement flow of the cooling water.

5. The water-cooling type condenser of claim 4, wherein, in the plate, the first communication portion and the second communication portion are located at upper and lower sides in a longitudinal direction from one side in a width direction of the plate, and the third communication portion and the fourth communication portion are located at the upper and lower sides in the longitudinal direction from the other side in the width direction of the plate.

6. The water-cooling type condenser of claim 5, wherein, in the fixing plate, a plurality of protruding bonding portions are formed in the longitudinal direction of the plate, some protruding bonding portions are formed at locations corresponding to the first communication portion to the fourth communication portion, and a certain area is hollow or closed.

7. The water-cooling type condenser of claim 6, wherein the gas and liquid separator includes a first hollow hole and a second hollow hole, and wherein the refrigerant is conveyed by a first connection pipe connecting the first hollow hole and one side of the protruding bonding portion formed on a location corresponding to the second communication portion and a second connection pipe connecting the second hollow hole and one side of the protruding bonding portion formed on a location corresponding to the first communication portion.

8. The water-cooling type condenser of claim 7, wherein the fixing plate includes a seating groove so that certain areas of the first connection pipe and the second connection pipe are inserted into the protruding bonding portions on locations corresponding to the second communication portion and the first communication portion.

9. The water-cooling type condenser of claim 7, wherein the first connection pipe and the second connection pipe include a step portion having a tubal shape and protruding along an outer circumferential surface to limit an insertion depth of both ends.

10. The water-cooling type condenser of claim 7, wherein the pair of protruding bonding portions are fixed to each other so as to maintain a temporary assembly state of the gas and liquid separator, the first connection pipe, the second connection pipe, and the fixing plate.

11. The water-cooling type condenser of claim 10, wherein a first fixing hole is formed in the protruding bonding portion, and a separate fixing means is coupled through a first fixing hole.

12. The water-cooling type condenser of claim 10, wherein a convex portion having a certain protruding area is formed on one side of the pair of protruding bonding portions and a concave portion into which the convex portion is inserted is formed on the other side.

13. The water-cooling type condenser of claim 1, wherein the fixing plate includes a first bending portion in which a circumference of the first plate portion is bent and extends toward the condensation area so that plates forming the condensation area are stacked and a second bending portion in which a circumference of the second plate portion is bent and extends toward the supercooling area so that plates forming the supercooling area are stacked.

14. The water-cooling type condenser of claim 4, wherein a refrigerant is discharged through the first outlet pipe by passing through a condensation area in which the refrigerant flowing into through the first inlet pipe is condensed while passing through the first flow portion, a gas and liquid separation area in which the refrigerant flows into the gas and liquid separator through the first connection pipe and is separated into gas and liquid refrigerants, and a supercooling area in which only the separated liquid refrigerant moves through the second connection pipe and is supercooled while passing through the first flow portion.

15. The water-cooling type condenser of claim 2, wherein cooling water flowing into through the second inlet pipe flows through the second flow portion and is discharged through the second outlet pipe.

16. The water-cooling type condenser of claim 1, further including: a bracket having a certain area fixed between the first plate portion and the second plate portion, wherein the fixing plate includes a bracket fixing portion from which a certain area of the first plate portion and the second plate portion protrudes to fix the bracket by forming spaced spaces apart from each other by a certain distance.

17. The water-cooling type condenser of claim 16, wherein the bracket includes a contact portion closely fixed to the spaced spaces of the bracket fixing portion, and a mounting portion extending from the contact portion for vehicle mounting.

18. The water-cooling type condenser of claim 17, wherein bracket fixing portions are formed on the upper and lower sides, respectively, wherein the contact portion of the bracket from which the mounting portion protrudes to the upper side is fixed to the bracket fixing portion on the upper side, and wherein the contact portion of the bracket from which the mounting portion protrudes to the lower side is fixed to the bracket fixing portion on the lower side.

19. The water-cooling type condenser of claim 17, wherein the bracket fixing portions are fixed to each other with the contact portion therebetween.

20. A water-cooling type condenser comprising:
a condensation area condensing a refrigerant by heat exchanging the refrigerant and cooling water;
a gas and liquid separator separating gas and liquid from the refrigerant condensed in the condensation area;
a supercooling area supercooling the refrigerant by heat exchanging the refrigerant passing through the gas and liquid separator and the cooling water;
a fixing plate in which a first plate portion corresponding to the condensation area and a second plate portion corresponding to the supercooling area are combined to face each other, flowing the refrigerant and the cooling water and fixing a partial wall surface of the gas and liquid separator; and
a bracket having a certain area fixed between the first plate portion and the second plate portion,
wherein the fixing plate includes a bracket fixing portion from which a certain area of the first plate portion and the second plate portion protrudes to fix the bracket by forming spaced spaces apart from each other by a certain distance, and
wherein the bracket includes a mounting hole with an elastic member interposed in the mounting portion.

21. A water-cooling type condenser comprising:
a condensation area condensing a refrigerant by heat exchanging the refrigerant and cooling water;
a gas and liquid separator separating gas and liquid from the refrigerant condensed in the condensation area;
a supercooling area supercooling the refrigerant by heat exchanging the refrigerant passing through the gas and liquid separator and the cooling water;
a fixing plate in which a first plate portion corresponding to the condensation area and a second plate portion corresponding to the supercooling area are combined to face each other, flowing the refrigerant and the cooling water and fixing a partial wall surface of the gas and liquid separator; and
a bracket having a certain area fixed between the first plate portion and the second plate portion,
wherein the fixing plate includes a bracket fixing portion from which a certain area of the first plate portion and the second plate portion protrudes to fix the bracket by forming spaced spaces apart from each other by a certain distance,
wherein the bracket includes a contact portion closely fixed to the spaced spaces of the bracket fixing portion, and a mounting portion extending from the contact portion for vehicle mounting, and
wherein the bracket includes a mounting pin in the mounting portion.

22. A water-cooling type condenser comprising:
a condensation area condensing a refrigerant by heat exchanging the refrigerant and cooling water;
a gas and liquid separator separating gas and liquid from the refrigerant condensed in the condensation area;
a supercooling area supercooling the refrigerant by heat exchanging the refrigerant passing through the gas and liquid separator and the cooling water;
a fixing plate in which a first plate portion corresponding to the condensation area and a second plate portion corresponding to the supercooling area are combined to face each other, flowing the refrigerant and the cooling water and fixing a partial wall surface of the gas and liquid separator; and
a bracket having a certain area fixed between the first plate portion and the second plate portion,
wherein the fixing plate includes a bracket fixing portion from which a certain area of the first plate portion and the second plate portion protrudes to fix the bracket by forming spaced spaces apart from each other by a certain distance,
wherein the bracket includes a contact portion closely fixed to the spaced spaces of the bracket fixing portion, and a mounting portion extending from the contact portion for vehicle mounting, and
wherein a fixing hole is formed in the bracket fixing portion, a fastening hole is formed in the contact portion, and a separate fastening means is fastened through the fixing hole and the fastening hole.

* * * * *